United States Patent
Sedlacek et al.

(10) Patent No.: US 6,702,038 B1
(45) Date of Patent: Mar. 9, 2004

(54) HYDRAULIC MOTOR

(76) Inventors: Miroslav Sedlacek, Pruchova 58, 150 00 Prague 5 (CZ); Stanislav Hostin, Mlynarovicova 11, 851 03 Bratislava (SI)

(*) Notice: Subject to any disclaimer, the term of this patent is extended or adjusted under 35 U.S.C. 154(b) by 0 days.

(21) Appl. No.: 09/673,674
(22) PCT Filed: May 19, 1999
(86) PCT No.: PCT/CZ99/00013
§ 371 (c)(1), (2), (4) Date: Oct. 17, 2000
(87) PCT Pub. No.: WO99/61790
PCT Pub. Date: Dec. 2, 1999

(30) Foreign Application Priority Data

May 22, 1998 (CZ) .............................. 8081-98

(51) Int. Cl.⁷ ................................ E21B 3/00
(52) U.S. Cl. .............. 173/218; 173/213; 173/221; 173/104; 415/219.1; 415/202; 415/904
(58) Field of Search ................. 173/218, 213, 173/221, 109, 104; 415/219.1, 202, 904, 90

(56) References Cited

U.S. PATENT DOCUMENTS

| | | | |
|---|---|---|---|
| 2,536,595 A | | 1/1951 | Dittmann |
| 2,648,939 A | * | 8/1953 | Zelik et al. ............... 451/440 |
| 2,830,560 A | * | 4/1958 | Doeden ................... 173/59 |
| 3,119,304 A | * | 1/1964 | Doeden ................... 409/144 |
| 3,120,705 A | * | 2/1964 | Hoffmeister et al. ...... 433/126 |
| 3,601,320 A | * | 8/1971 | Plessis .................... 239/542 |
| 4,008,774 A | | 2/1977 | Milano et al. |
| 4,629,395 A | * | 12/1986 | Mohsin ................... 415/75 |
| 4,776,752 A | * | 10/1988 | Davis ..................... 415/25 |
| 4,968,306 A | * | 11/1990 | Huss et al. .............. 604/264 |
| 5,217,166 A | * | 6/1993 | Schulze et al. ........... 239/227 |
| 5,503,334 A | * | 4/1996 | Pacht ..................... 239/252 |
| 5,566,770 A | * | 10/1996 | Bowser ................... 173/218 |
| 5,725,680 A | * | 3/1998 | Mathieus ................. 134/38 |
| 5,934,385 A | * | 8/1999 | Svensson ................. 173/177 |

FOREIGN PATENT DOCUMENTS

| | | |
|---|---|---|
| EP | 240093 | 10/1987 |
| FR | 542461 | 8/1922 |
| FR | 2662104 | 11/1991 |
| WO | WO9817910 | 4/1998 |

* cited by examiner

Primary Examiner—Rinaldi I. Rada
Assistant Examiner—Louis Tran
(74) Attorney, Agent, or Firm—Hovey Williams LLP

(57) ABSTRACT

A hydraulic motor, especially for driving of rotating tools, consisting of a chamber (2) provided with an inlet (10) for supplying fluid, and with at least one outlet hole (6), before which, on a holding device, a rolling rotor (7) is seated, the rolling rotor (7) is formed by a body of rotational shape. That the chamber (2) is at least in its internal surface of rotational shape and of a tapering diameter. The chamber (2) is on its side of the maximum diameter open, and on the side of its minimum diameter limited by means of a wall (3), in the middle of which a hole (4) is provided, through which a shaft (5) passes with a clearance, the shaft (5) carrying the rolling rotor (7). The shaft (5) is inside the chamber (2) provided with a recess (8), the diameter of which is larger than the diameter of the hole (4) in the wall (3).

21 Claims, 3 Drawing Sheets

HYDRAULIC MOTOR

BACKGROUND OF THE INVENTION

1. Field of the Invention

The invention relates to a hydraulic motor, especially for driving of rotating tools, consisting of a chamber, provided with an inlet for supplying fluid, and with at least one outlet hole, before which, on a holding device, a rolling rotor is seated, the rolling rotor is formed by a body of rotational shape.

2. Description of the Prior Art

Many devices exist where hydraulic motors are used to drive rotating equipment or tools. It is advantageous, to use normal water-supply piping as a source of pressure fluid for manual and mobile equipment. As a hydraulic motor for this type of equipment a Pelton turbine and its modification and/or various modification of waterwheel are mostly used. Their purpose is to transform the pressure and kinetic energy of water, supplied by inlet piping into rotational power which drives certain equipment used very often for cleaning processes, if water as a power medium is used. The drawback of all above described solutions is the fact that the torsional moment on the shaft is accompanied by extremely high shaft rotating speed which is not always suitable for final use, and therefore the speed of rotation must be considerably reduced by gearing. Simultaneously principally there is a limit to the reductions of the basic hydromotor unit the main wheel, which transforms the energy of the water flow into the torsional moment, because the reduction in the size of this main wheel also increases its rotational speed and reduces the torsional moment thus making the gearing system progressively more complicated.

From the Czech patent application PV972-97 and from the international patent application PCT/CZ/97/00034, there is known a fluid rolling machine consisting of a chamber provided with an inlet for fluid inflow and at least one outlet hole, before which is placed a holding device supporting a rolling rotor which consists of a body of rotational shape.

The aim of the solution is to modify this fluid rolling machine in such a way that it may be in the best possible way suitable for driving rotating tools.

SUMMARY OF THE INVENTION

The mentioned aim is achieved by means of a hydraulic motor especially for driving rotating tools, consisting of a chamber provided with an inlet for supplying of liquid and with at least one outlet hole, before which, on a holding device, a rolling rotor is seated. The rolling rotor is formed by a body of a rotational shape, according to this invention, the principle of which resides in the fact that the chamber is at least in its internal surface of a rotational shape and of a tapering diameter, and the chamber is open on its side of the maximum diameter, and limited by a wall on its side of the minimum diameter. In the middle of said wall is provided a hole, through which a shaft passes with a clearance. The shaft carries the rolling rotor. The shaft is provided, inside the chamber, with a recess, the diameter of which is larger than the diameter of the hole in the wall. Several outlet holes are arranged round the hole in the wall.

The hydraulic motor according to this technical solution needs no gearing for achieving operational speed of rotation, suitable for driving rotating tools, and its size may be considerably smaller than with known embodiments, while still having the required torsional moment.

According to an advantageous embodiment, the rolling rotor can have a shape of a hollow and open hemisphere which is fixed onto the shaft by its open side against the liquid flow.

According to another advantageous embodiment, the chamber has, at least on its internal surface, a shape of a truncated cone of a lateral area under the slope of 4 to 8°.

According to another embodiment, an adapter for clamping exchangeable tools is arranged on the end of the shaft which protrudes from the chamber.

To make the handling easier, it is advantageous, if in the chamber, on the side of its maximum diameter, a handle is fixed, onto which the inlet for the liquid supply is connected, and in the handle a control valve for controlling the liquid flow is provided.

According to another embodiment, axes of outlet holes in the walls of the chamber may be deflected from the longitudinal axis of the hydraulic motor, and in the jacket of the chamber there can be made additional outlet holes, and the inlet of liquid is formed by a flexible hose.

According to a further embodiment, the chamber may be seated coaxially in an additional jacket which is terminated with a rotating nozzle connected to the shaft.

The chamber may be also enclosed in a case, through the face wall of which a shaft passes, being fluid-tightly sealed, and the case is provided with an outlet for draining liquid.

According to various advantageous embodiments, the exchangeable tool may be represented by a brush head cleaner, or brush, or sponge, or drill, or milling cutter, or grater, or abrasive stone, or massage adapter, or mixing adapter.

BRIEF DESCRIPTION OF DRAWINGS

The hydraulic motor according to the invention will be described in details on particular embodiments showed on drawings where individual drawings illustrate.

MODES FOR CARRYING OUT THE INVENTION

Figure 1:
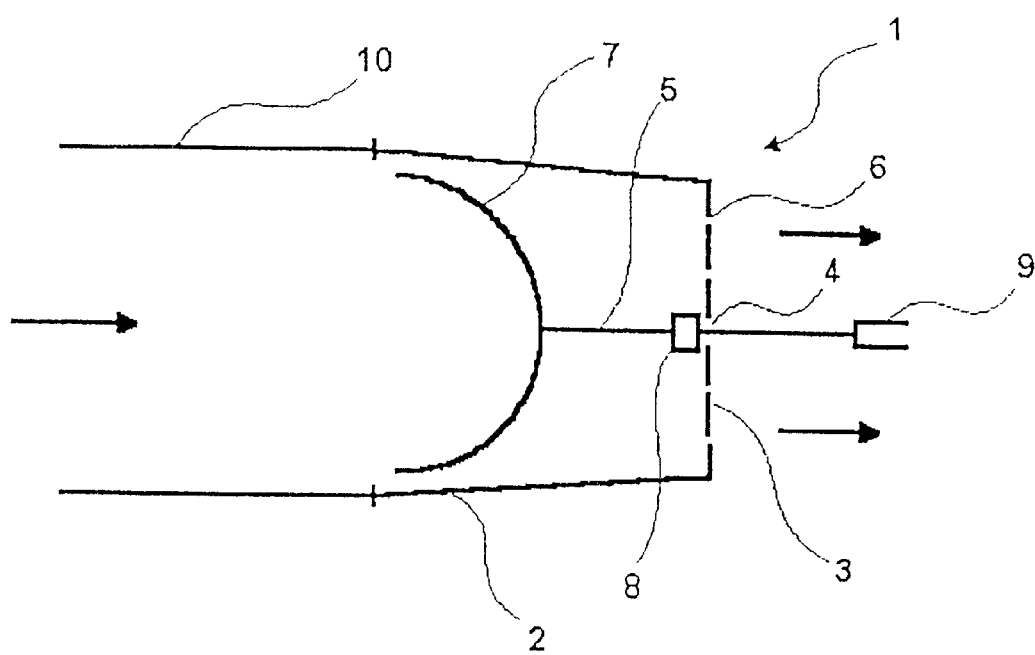
FIG. 1 is a diagrammatical cross-sectional view of a hydraulic motor with an adapter for clamping exchangeable tools.

On FIG. 1, the first example embodiment of a hydraulic motor 1 for driving rotating tools by means of water from water-supply piping is illustrated. The hydraulic motor consists of a chamber 2 being shaped as a truncated cone with the lateral area, having a slope of 7°. On the side of a larger diameter, the chamber 2 is open and a flexible hose of an inlet 10 for supplying liquid is connected to it. On the opposite side, the chamber 2 is closed by means of a wall 3, in the middle of which there is made a hole 4 for a shaft 5 and concentrically outlet holes 6 of the liquid. The hole 4 for the shaft 5 has such a diameter and shape that it may enable not only a rotation of the shaft 5 but its swinging as well. The shaft 5 is provided inside the chamber 2 with a recess 8, the diameter of which is larger than the diameter of the hole 4 in the wall 3. Onto the shaft 5 inside the chamber 2, a rolling rotor 7 is fixed. The rotor 7 can have an arbitrary rotational shape. A hollow hemisphere, open against the liquid flow, proved to be an advantageous shape for the described embodiment. The end of the shaft 5 which protrudes from the chamber 2 is provided with an adapter 9 for clamping exchangeable tools.

After opening an unshown valve, water flows through the inlet 10 into the chamber 2, from which it flows out through outlets 6. By the water flow, the rotor 7, by means of a recess 8, made on the shaft 5, leans against the wall 3, and at the same time it starts rolling along the circumferential jacket of the chamber 2. The end of the shaft 5, with an adapter 9 protruding from the chamber 2, starts to rotate and simultaneously follows a path of a small circle. Because the difference between the maximum diameter of the rotor 7 and the diameter of the chamber 2 in the place of the rotor 7 rolling path is usually not larger than 1 mm the shaft 5 swing is negligible for the intended application.

As to the described embodiment example of the hydraulic motor 1, revolutions of the shaft 5, at the water flow through the hydraulic motor at the rate of about 0.17 to 0.2 l/s, may be expected within about 420 to 450 rpm. Water pressure in the inlet 10 for supplying water should be between 2.4 up to 3.6 kPa.

Figure 2:
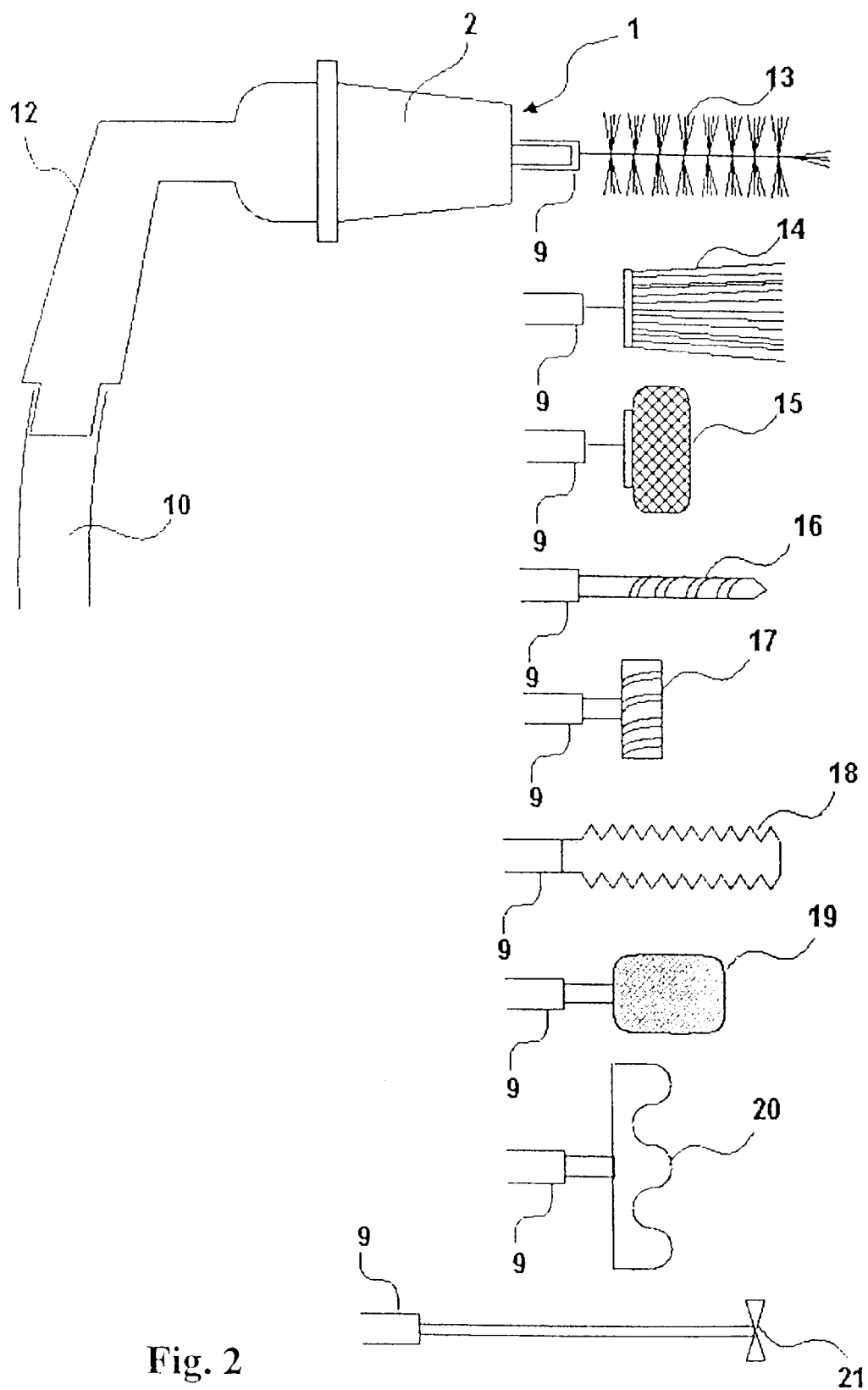
FIG. 2 is a diagrammatical elevational view of a hydraulic motor with a handle and a set of exchangeable tools.

FIG. 2 shows another embodiment of the hydraulic motor 1 which differs from the embodiment shown on FIG. 1 only by that, between the chamber 2 and the inlet 10 for liquid supplying liquid, there is mounted a handle 12, provided with a built-in control valve for controlling the liquid flow. It can be a normally available manual garden sprayer, connectable to a hose. FIG. 2 also shows an example of a set of exchangeable tools, for example a brush head cleaner 13, a brush 14, a sponge 15, a drill 16, a milling cutter 17, a grater 18, an abrasive store 19, a massage adapter 20 and a mixing adapter 21.

The function of the embodiment shown on FIG. 2 is the same as of the embodiment shown on FIG. 1. As it is evident from the above indicated exchangeable tools, this embodiment may be applied to cleaning, grinding, polishing, drilling, milling and mixing materials, and also for a body massaging.

Figure 3:
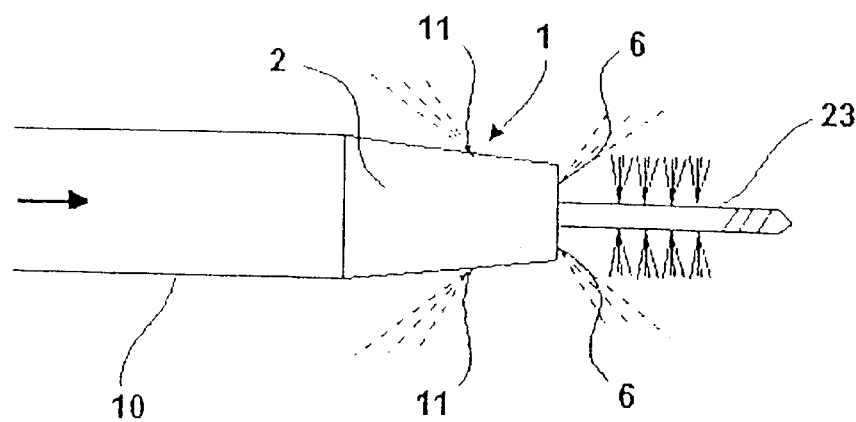
FIG. 3 is a diagrammatical elevational view of a hydraulic motor adapted for cleaning piping.

On FIG. 3 there is illustrated an embodiment of the hydraulic motor 1 for cleaning piping. The inlet 10 is represented by a flexible hose, and outlets 6 made in the wall 3 of the chamber 2 have their axes declined from the longitudinal axis of the hydraulic motor for directing the liquid flow to the internal wall of the piping being cleaned. For the same reason there are made, in the jacket of the chamber 2, additional outlet holes 11. The shaft 5 is terminated with a push-cleaning tool 23.

After putting the hydraulic motor 1 into the piping being cleaned, this piping is cleaned both with a water flow from the outlet holes 6 in the wall 3 of the chamber 2, from additional outlet holes 11 in the jacket of the chamber 2 and by rotation of the push-cleaning tool 23.

Figure 4:
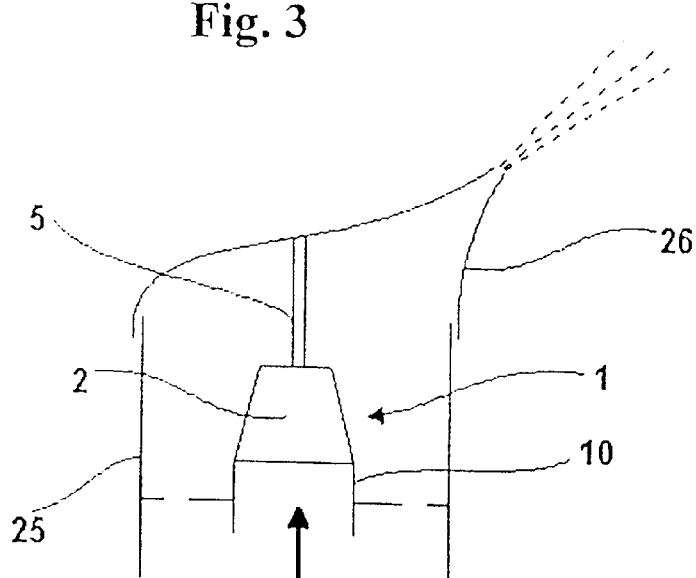
FIG. 4 is a diagrammatical elevational view of a hydraulic motor with a rotating nozzle.

On FIG. 4 there is illustrated the hydraulic motor 1 provided with a rotating nozzle 26 for spraying gardens or fields. The chamber 2 and the hydraulic motor 1 are seated coaxially in an additional jacket 25 which is closed, on its top, by the rotating nozzle 26, connected to the shaft 5 of the hydraulic motor 1.

Water is supplied not only into the chamber 2 where it rotates the shaft 5 and the rotating nozzle 26, but also into the additional jacket 25 of the hydraulic motor 1 for increasing the water flow.

For some applications it is advantageous, if the liquid is drained from the hydraulic motor 1 outside the working space which makes it possible to utilize the hydraulic motor 1 also for dry working processes.

Figure 5:
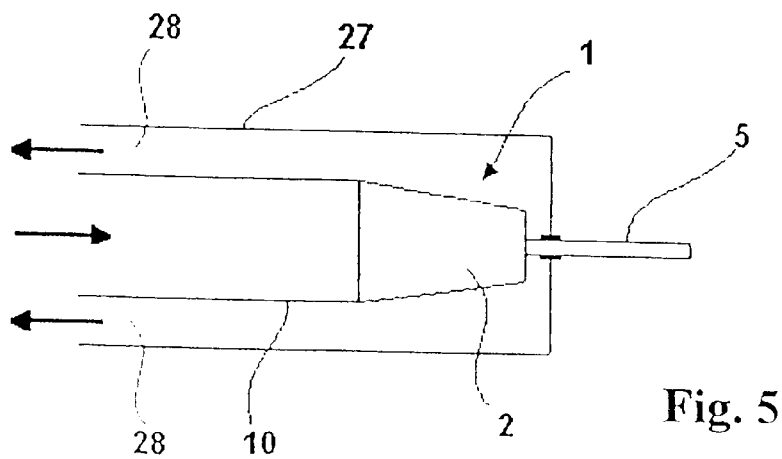
FIG. 5 is a diagrammatical elevational view of a hydraulic motor in a tightened case with a liquid outlet.

An example of such an embodiment is illustrated on FIG. 5. The chamber 2 of the hydraulic motor 1 is enclosed in a case 27, through the face wall of which the shaft 5, sealed against the liquid penetration, is passing. The case 27 is provided with an outlet 28 for draining liquid outside the working space.

Such an embodiment of the hydraulic motor 1 may be applied e.g. as a drill, a grinder, a winding equipment, a mixing equipment, a mixer, a drive of an electric power generator or pump, a polisher, a planer, a circular saw, a screw driver, a tightener, a rotational tooth brush, a milling machine, a hydraulic drive of machine parts, and the like.

INDUSTRIAL APPLICABILITY

The hydraulic motor according to the technical solution can be applied in connection with respective brushes for cleaning, when applying water, as a manual washing set, at which it is possible easily to change various types of brushes. Said application may be carried out both in industry and in households, in gardens, in firms and institutions supplying various services, and it may concern a cleaning of tools and implements, working aids, sanitary ceramics and aids, ceramic lining, kitchen crockery, coachworks, car bodies and other transport vehicles and their engines, and the like. Needed water pressure may be at the level of pressure which is usually supplied by water-supply piping. When applying said usual pressure or a higher pressure, the hydraulic motor may be applied as a driving unit in connection with respective adapters for cleaning building facades, for cleaning gaps, fissures and breakings in concrete, bituminous and similar surfaces, for washing and cleaning various kinds of pavement and lining-surfacing materials, for cleaning windows, and the like.

This hydraulic motor may be also applied for cleaning piping, if it is connected to a flexible hose and provided with respective push cleaning tools. If it is provided with a massage adapter, it may serve as a massage shower in cooperation with a rotation mechanical massaging. More over it can be applied as a driving unit for specialized machines and tools, e.g. for treating stone, cutting and drilling into a stone, concrete and similar materials and surfaces, where water is a suitable accompanying medium, for polishing surfaces of various materials and surfaces, and the like. It can be also applied at the end of an irrigation piping and for spraying of irrigation water. It is also possible to apply it as manual tools under a water surface, e.g. for driving tools, for screw tightening; for drilling, cutting, grinding, and the like. It may also serve as a driving unit for child's toys in pools/baths and toys connected to water-supply piping, because due to its design it can be suitably dimensioned with respect to the safety point of view. It may be also applied in a closed liquid circuit, and to serve in this way as a liquid motor, eventually servomotor anywhere, where it is not suitable or necessary to use liquid for certain working or technological process.

What is claimed is:

1. A hydraulic motor comprising:
   a chamber having wall structure presenting a fluid inlet, an internal surface, a shaft passage hole, and at least one fluid outlet hole;
   a rolling rotor body located within said chamber between said fluid inlet and said shaft passage hole and having a outer surface of a rotational shape configured for rolling movement within the chamber; and an elongated shaft having a proximate end secured to said rotor body, said shaft including a stop mounted thereon and positioned within the chamber and configured for inhibiting axial movement of the shaft through the shaft passage hole, said shaft extending through said shaft passage hole and presenting a remote end located outside of said chamber, there being sufficient clearance between said shaft and said shaft passage hole to permit precessional movement of said shaft proximate end during said rolling movement of said rotor body.

2. The hydraulic motor as claimed in claim 1, wherein the rolling rotor body has a shape of a hollow and open hemisphere having an open side and which is fixed onto the shaft with its open side oriented generally toward said fluid inlet.

3. The hydraulic motor as in claim 1, wherein the chamber has, at least on its internal surface, a shape of a truncated cone of a lateral area under the slope of 4 to 8.

4. The hydraulic motor as in claim 1, including an adapter for clamping exchangeable tools located at the remote end of the shaft which protrudes from the chamber.

5. The hydraulic motor as in claim 1, including a handle connected to the chamber on the wall structure, to which handle the fluid inlet for a liquid supply is connected, and including a control valve in the handle for controlling the liquid flow.

6. The hydraulic motor as in claim 1, wherein said at least one fluid outlet hole includes a plurality of fluid outlet holes, each of said plurality of outlet holes having an axis and wherein the hydraulic motor has a longitudinal axis and wherein axes of the outlet holes in the wall structure of the chamber are obliquely angled with respect to the longitudinal axis of the hydraulic motor, and wherein the fluid inlet for supplying liquid includes a flexible hose.

7. The hydraulic motor as in claim 1, wherein the chamber is coaxially seated in an additional jacket which is terminated by a rotatable nozzle, connected to the shaft.

8. The hydraulic motor as in claim 1, wherein the chamber is enclosed in a case having a face wall through which the shaft passes, being fluid-tightly sealed, and the case is provided with an outlet for draining the liquid.

9. The hydraulic motor as in claim 4, including an exchangeable tool coupled to the adapter, the exchangeable tool being selected from the group consisting of a brush head cleaner, a brush, a sponge, a drill, a milling cutter, a grater, an abrasive stone, a massage adapter and a mixing adapter.

10. A hydraulic motor comprising:

a chamber having a longitudinal axis, an inlet for supplying liquid to the chamber and at least one outlet for the discharge of liquid from the chamber, said chamber including an internal surface of frustoconical shape and tapering in diameter from a first side of maximum diameter to a second side of minimum diameter, said chamber including a wall at said second side having a shaft passage hole through the middle thereof;

a rolling rotor received within the chamber, said rotor including a body having an outer surface of a rotational shape; and a shaft passing through said shaft passage hole, the shaft passage hole being sized to provide a clearance therebetween, said shaft having a remote end located outside the chamber, a proximate end located inside the chamber, and a portion located inside the chamber provided with a stop coupled thereto, said shaft being operatively connected to the rolling rotor body, said stop being sized greater than the hole in the wall, and wherein the clearance provided by said shaft passage hole is sufficient to permit the rolling movement of the body and engagement of the outer surface of the body along the internal surface of the chamber, and to permit consequent precessional movement of the proximate end of the shaft during said rolling movement of the body.

11. The hydraulic motor as claimed in claim 10, wherein the rotor has a substantially hemispherical shape having a concave side and a convex side and wherein said concave side is oriented to engage liquid flowing from the inlet thereagainst.

12. The hydraulic motor as claimed in claim 10 wherein the internal surface has a slope of from about 4 to 8 relative to the longitudinal axis of the chamber.

13. The hydraulic motor as claimed in claim 10, including an adapter mounted at the remote end located outside the chamber.

14. The hydraulic motor as claimed in claim 13, including at least one tool removably mounted on the adapter for movement with the shaft.

15. The hydraulic motor as claimed in claim 14, wherein the tool is selected from the group consisting of a brush head cleaner, a brush, a sponge, a drill, a milling cutter, a grater, an abrasive stone, a massage adapter, and a mixing adapter.

16. The hydraulic motor as claimed in claim 13, wherein the shaft couples the adapter to the rotor in direct drive relationship.

17. The hydraulic motor as claimed in claim 10, including a handle connected to the chamber proximate the first side, the inlet being operatively coupled to the handle, the handle further including a control valve for selectively controlling the flow of liquid into the chamber.

18. The hydraulic motor as claimed in claim 10, wherein the outlet includes a plurality of first outlet holes in the wall, each of said first outlet holes having an axis, and wherein each of the axes are angled relative to the longitudinal axis of the chamber.

19. The hydraulic motor as claimed in claim 18, wherein the chamber includes a jacket extending rearwardly from said wall, said jacket having a plurality of second outlet holes, each of said second outlet holes having an axis angled relative to the longitudinal axis of the chamber and the axis of said first outlet holes.

20. The hydraulic motor as claimed in claim 10, the chamber including a primary jacket for providing the internal surface and extending forwardly to said wall, and including a secondary jacket surrounding the chamber, and wherein the chamber is coaxially seated within the secondary jacket, the secondary jacket including a rotatable nozzle operatively connected to said shaft.

21. The hydraulic motor as set forth in claim 6, wherein said chamber includes a jacket and including outlet holes in said jacket, each having an axis obliquely angled relative to the longitudinal axis of the hydraulic motor.

* * * * *